(12) United States Patent
Nishio et al.

(10) Patent No.: US 10,218,041 B2
(45) Date of Patent: Feb. 26, 2019

(54) TEMPERATURE CONTROL DEVICE FOR BATTERY PACK OF VEHICLE

(71) Applicant: MITSUBISHI JIDOSHA KOGYO KABUSHIKI KAISHA, Tokyo (JP)

(72) Inventors: Yoshiaki Nishio, Okazaki (JP); Kazuhisa Akita, Okazaki (JP)

(73) Assignee: MITSUBISHI JIDOSHA KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 14/792,170

(22) Filed: Jul. 6, 2015

(65) Prior Publication Data
US 2016/0001633 A1 Jan. 7, 2016

(30) Foreign Application Priority Data
Jul. 7, 2014 (JP) ................................. 2014-139256

(51) Int. Cl.
| | | |
|---|---|---|
| *H01M 10/625* | (2014.01) | |
| *H01M 10/63* | (2014.01) | |
| *H01M 10/615* | (2014.01) | |
| *H01M 10/6563* | (2014.01) | |
| *H05B 1/02* | (2006.01) | |
| *H05B 3/14* | (2006.01) | |

(52) U.S. Cl.
CPC ....... *H01M 10/625* (2015.04); *H01M 10/615* (2015.04); *H01M 10/63* (2015.04);
(Continued)

(58) Field of Classification Search
CPC .. H01M 10/625; H01M 10/615; H01M 10/63; H01M 10/6563; H01M 2220/20;
(Continued)

(56) References Cited

U.S. PATENT DOCUMENTS

| | | | | |
|---|---|---|---|---|
| 5,743,631 A | * | 4/1998 | Bigham | .................. B60S 1/026 362/294 |
| 2010/0236853 A1 | | 9/2010 | Kramer | |

(Continued)

FOREIGN PATENT DOCUMENTS

| | | | |
|---|---|---|---|
| CN | 103682521 | * | 3/2014 |
| CN | 103682521 A | | 3/2014 |

(Continued)

OTHER PUBLICATIONS

Office Action issued in the corresponding Japanese Patent Application No. 2014-139256, dated Aug. 17, 2017, with an English machine translation thereof.

*Primary Examiner* — Shawntina T Fuqua
(74) *Attorney, Agent, or Firm* — Birch, Stewart, Kolasch & Birch, LLP

(57) ABSTRACT

In a temperature control device for a battery pack includes: a medium circulation path which is provided within a battery case accommodating a battery for travelling the vehicle and circulates heating medium therein to heat the battery; a heating part which is provided in the medium circulation path and heats the heating medium; a fan which is provided in the medium circulation path and sends the heating medium; and an excessive heating preventing part which is provided in the medium circulation path and stops a heating operation of the heating part at a predetermined temperature.

13 Claims, 4 Drawing Sheets

(52) U.S. Cl.
   CPC ...... H01M 10/6563 (2015.04); H05B 1/0236 (2013.01); H05B 3/145 (2013.01); *F24D 2200/29* (2013.01); *H01M 2220/20* (2013.01); *H05B 2203/014* (2013.01); *H05B 2203/02* (2013.01)

(58) Field of Classification Search
   CPC .................. H05B 1/0236; H05B 3/145; H05B 2203/014; H05B 2203/02; F24D 2200/29
   See application file for complete search history.

(56) References Cited

U.S. PATENT DOCUMENTS

| | | |
|---|---|---|
| 2014/0069113 A1 | 3/2014 | Oh et al. |
| 2015/0037633 A1 | 2/2015 | Akiyama et al. |
| 2015/0118536 A1* | 4/2015 | Iwasa .................. H01M 10/625 429/120 |
| 2015/0147618 A1* | 5/2015 | Nakamori ................ B60K 1/04 429/96 |
| 2015/0280292 A1 | 10/2015 | Nagano et al. |

FOREIGN PATENT DOCUMENTS

| | | |
|---|---|---|
| CN | 103814474 * | 5/2014 |
| CN | 103814474 A | 5/2014 |
| JP | 10-284133 A | 10/1998 |
| JP | 2013-203190 A | 10/2013 |
| JP | 2013-251111 A | 12/2013 |
| WO | WO 2013/137185 A1 | 9/2013 |
| WO | WO 2014/065255 A1 | 5/2014 |

* cited by examiner

TEMPERATURE CONTROL DEVICE FOR BATTERY PACK OF VEHICLE

CROSS REFERENCE TO RELATED APPLICATIONS

This application is based on Japanese Patent Application (No. 2014-139256) filed on Jul. 7, 2014, the contents of which are incorporated herein by reference.

BACKGROUND

The present invention relates to temperature control devices for battery packs of vehicles.

There have been known vehicles in each of which a battery pack is mounted and an electric motor is driven by electric power supplied from the battery pack, thus travelling the vehicle.

The battery pack includes a battery and a battery case for housing the battery therein.

When temperature of a battery reduces to a low value, for example, a value lower than 0° C., an output of the battery reduces. This state is disadvantageous in exerting travelling function sufficiently.

In view of this circumstances, a technology has been proposed in which a heater is provided at a battery pack so that, at low temperature, the heater heats the battery to a temperature sufficient to take out a required output from the battery.

[Patent Literature 1] JP-A-2013-251111

SUMMARY

According to the invention, a temperature control device for a battery pack of a vehicle is provided which can surly suppress excessive heating of a battery, thereby improving durability of the battery.

According to an advantageous aspect of the invention, there is provided a temperature control device for a battery pack includes: a medium circulation path which is provided within a battery case accommodating a battery for travelling the vehicle and circulates heating medium therein to heat the battery; a heating part which is provided in the medium circulation path and heats the heating medium; a fan which is provided in the medium circulation path and sends the heating medium; and an excessive heating preventing part which is provided in the medium circulation path and stops a heating operation of the heating part at a predetermined temperature.

The medium circulation path may include a bent part between the heating part and the fan. The excessive heating preventing part may be disposed between the bent part and the fan.

The excessive heating preventing part may be disposed at upper position than the heating part.

A suction port of the fan may be disposed so as to oppose to an inner wall of the medium circulation path.

The excessive heating preventing part may be disposed at a portion on the inner wall opposing to the suction port. This portion may locate on the heating part side from an axial center of the suction port.

BRIEF DESCRIPTION OF DRAWINGS

FIG. 5A shows a case that an excessive heating preventing part is configured of a thermostat switch. FIG. 5B shows a case that the excessive heating preventing part is configured of a temperature fuse.

DETAILED DESCRIPTION OF EXEMPLIFIED EMBODIMENT

Figure 1:
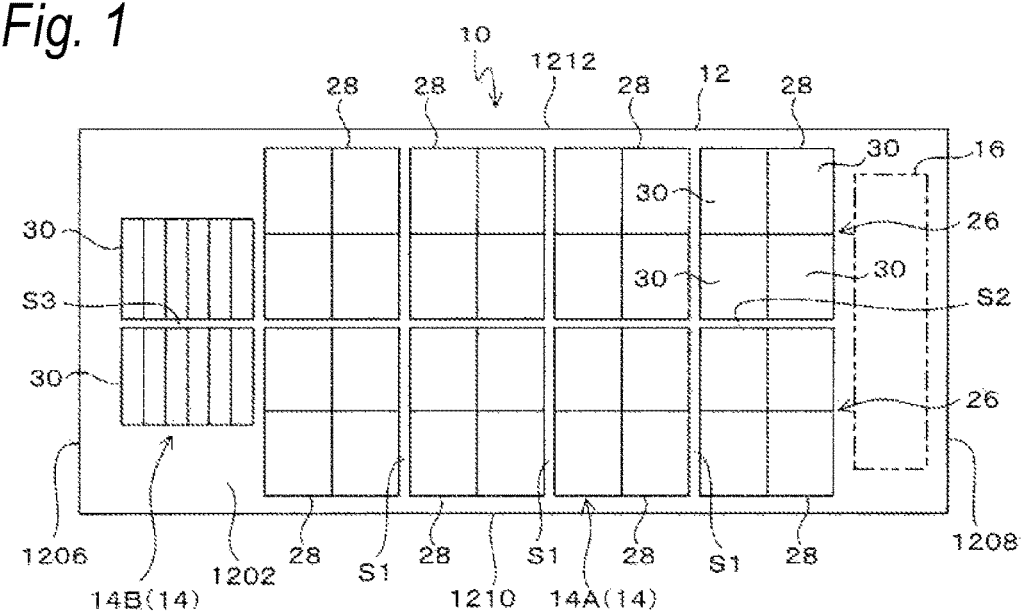
FIG. 1 is a plan view of a battery pack to which a temperature control device for the battery pack according to an embodiment is applied, in which portions except for first and second battery groups and peripheral components are omitted.

At the time of heating a battery by a heater, if the battery is heated excessively due to a malfunction that the heater is kept in a turned-on state and can not be restored to a turned-off state, deterioration of the battery is accelerated. This phenomenon is disadvantageous in improving durability of the battery.

According to the invention, a temperature control device for a battery pack of a vehicle is provided which can surely suppress excessive heating of a battery, thereby improving durability of the battery.

Hereinafter, explanation will be given of the temperature control device for a battery pack of a vehicle according to an embodiment of the invention.

The battery pack in this embodiment is used as a battery for travelling which is mounted in an electric vehicle such as a hybrid car or a plug-in hybrid car, for driving a motor using electric power to travel the vehicle. The battery for travelling charges electric power for travelling the electric vehicle.

As shown in FIGS. 1 to 4, a battery pack 10 includes a battery case 12. The battery case 12 houses and holds therein a battery 14, peripheral components 16, a medium circulation path 18, a heating part 20, a fan 22 and an excessive heating preventing part 24, etc.

A battery pack temperature control device 100 according to the embodiment is configured by including the medium circulation path 18, the heating part 20, the fan 22 and the excessive heating preventing part 24.

As shown in FIG. 1, the battery case 12 has a rectangular shape in a planar view. The longitudinal direction of the battery case 12 coincides with the longitudinal direction of the vehicle. The battery case 12 is arranged at the center in the width direction of the vehicle. The battery case 12 is arranged beneath a not-shown floor panel and inside of a not-shown pair of side members. The battery case 12 is attached to the pair of side members via an attachment member.

Figure 3:
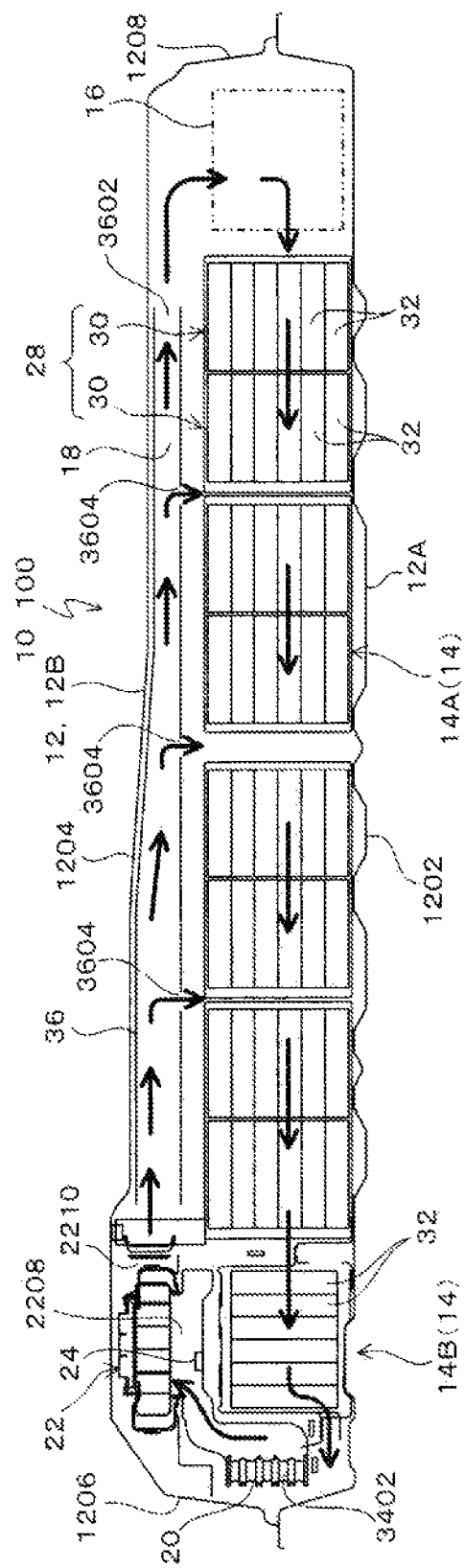
FIG. 3 is a sectional view taken along line A-A in FIG. 2.

As shown in FIG. 3, the battery case 12 includes a tray 12A and a cover 12B.

The battery case 12 is configured by putting the cover 12B on the tray 12A. The cover 12B is joined to the tray 12A via a not-shown sealing member by means of screws or clips. A sealed space is formed within the battery case 12.

Figure 2:
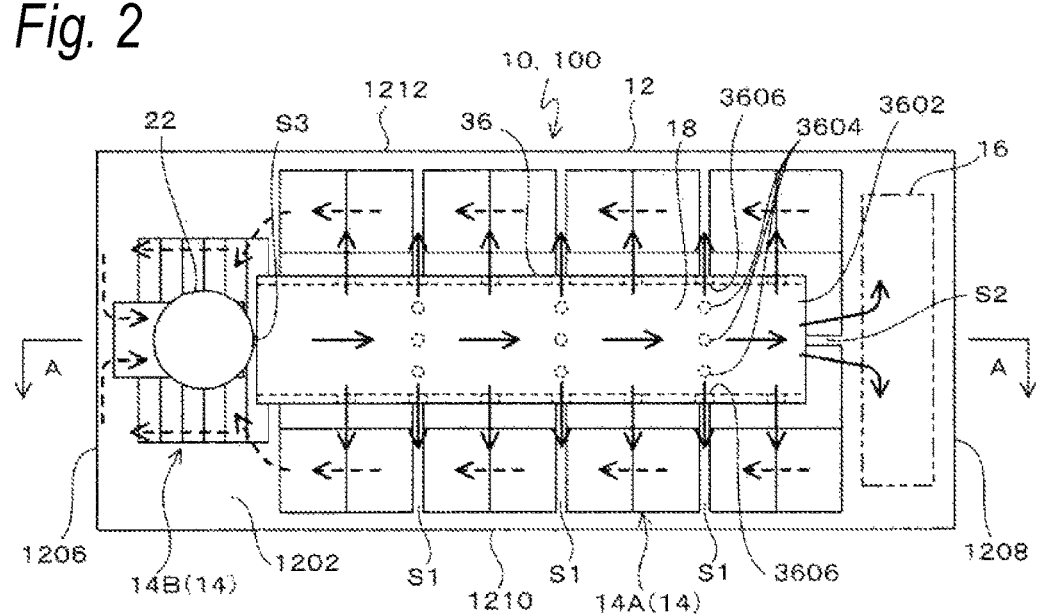
FIG. 2 is a plan view of the battery pack to which the temperature control device for the battery pack according to the embodiment is applied.

As shown in FIGS. 2 and 3, the battery case 12 includes a rectangular bottom face 1202, a rectangular upper face 1204, a rectangular front face 1206, a rectangular rear face 1208, a rectangular left side face 1210 and a rectangular right side face 1212.

As shown in FIG. 1, the battery 14 is configured by including a first battery group 14A and a second battery group 14B.

The first battery group 14A is configured of two battery block rows 26. Each of the battery block rows 26 is configured of four battery blocks 28. These four battery blocks are aligned in the longitudinal direction of the vehicle so as to have an interval between every adjacent ones thereof. The two battery block rows 26 are aligned in the vehicle width direction with an interval therebetween.

Each of the battery blocks 28 includes four battery modules 30. In each of the battery blocks 28, the four battery modules 30 are arranged on the bottom surface 1202 of the battery case 12 in a manner that a set of two battery modules aligned in the vehicle width direction are provided two in the longitudinal direction of the vehicle. As shown in FIG. 3, each of the battery modules 30 is configured by stacking six battery cells 32 in the thickness direction of the battery pack. Each of the battery cells has a rectangular plate shape. In each of the battery modules 30 of the first battery group 14A, the battery cells 32 are stacked in the upper-lower direction of the vehicle.

In each of the battery block rows 26, a gap S1 capable of flowing air therethrough is formed along the vehicle width direction between every adjacent ones of the four battery blocks 28 aligned along the longitudinal direction of the vehicle. Further, a gap S2 capable of flowing air therethrough is formed along the longitudinal direction of the vehicle between adjacent sets of the four battery blocks 28 of the two battery block rows 26 aligned along the vehicle width direction.

The second battery group 14B includes two battery modules 30 aligned along the vehicle width direction with an interval therebetween.

Each of the battery modules 30 is configured by stacking six battery cells 32 along the thickness direction of the battery pack. Each of the battery cells has a rectangular plate shape. In each of the battery modules 30 of the second battery group 14B, the battery cells 32 are stacked along the longitudinal direction of the vehicle.

A gap S3 capable of flowing air therethrough is formed along the longitudinal direction of the vehicle between the two battery modules 30.

The peripheral components 16 serve to function the battery 14.

The peripheral components 16 are disposed at one end, along the longitudinal direction of the vehicle, of the battery pack 10 on the opposite side of the second battery group 14B via the first battery group 14A.

Figure 4:
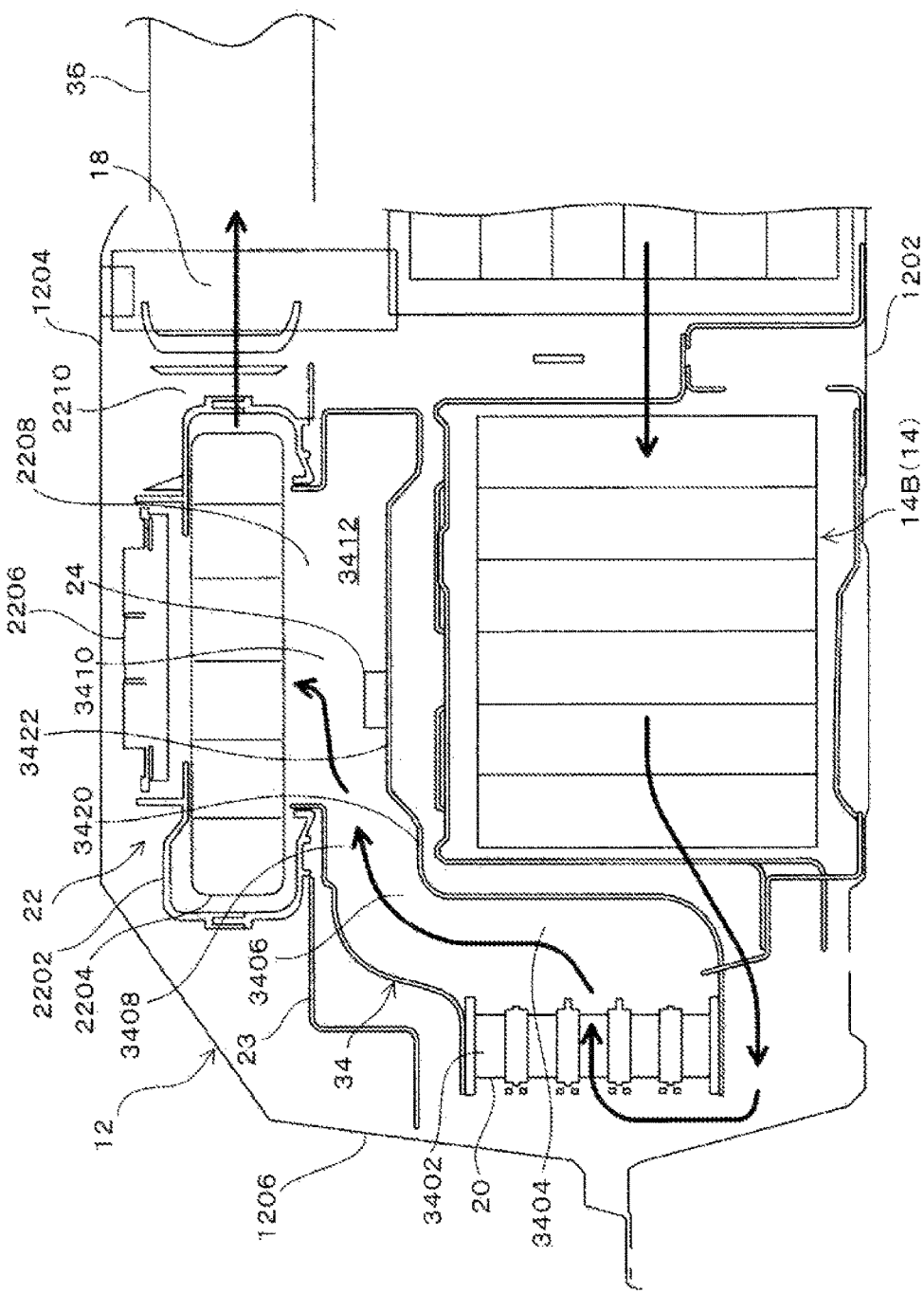
FIG. 4 is an enlarged diagram of a main part of FIG. 3.

As shown in FIGS. 3 and 4, the heating part 20 heats heating medium provided in the medium circulation path 18. The heating medium is air in this embodiment.

The heating part 20 is arranged between the rear side of the front face 1206 of the battery case 12 and the front side of the second battery group 14B.

The heating part 20 is configured to heat air passing the heating part 20.

In this embodiment, a PTC (Positive Temperature Coefficient) heater is used as the heating part 20.

The PTC heater has properties that a resistance value thereof increases according to the increase of temperature.

Thus, when the PTC heater is supplied with current to start a heating operation, the resistance value of the PTC heater increases according to the increase of temperature and hence a value of the current flowing therein reduces.

As a result, it is not necessary to control current supplied to the PTC heater based on a detection value of heated temperature of the PTC heater. Accordingly, the configuration of the heating part 20 can be simplified and the heated temperature of the heating part can be maintained stably.

Incidentally, any desirable one of various kinds of known heaters using a nichrome wire, a carbon fiber or the like may be used as the heating part 20. In this case, it is required to use a temperature control part which detects the heated temperature of the heater and controls current supplied to the heater so that the heated temperature becomes constant.

As shown in FIGS. 3 and 4, the fan 22 is provided in the medium circulation path 18 and sends air. In other words, the fan 22 circulates air in the medium circulation path 18.

The fan 22 is disposed at a portion beneath the upper face 1204 and above the second battery group 14B.

In this embodiment, a sirocco fan is used as the fan 22.

As shown in FIG. 4, the fan 22 is configured by including a housing 2202, a fan rotor 2204, a motor 2206, a suction port 2208 and a blow-out port 2210.

The housing 2202 is supported by the battery case 12 via a bracket 23.

The fan rotor 2204 has a plurality of blades arranged along the circumferential direction of a rotation axis of the fan rotor. The fan rotor is housed within the housing 2202 in a manner that the rotation axis is directed in an up-down direction.

The motor 2206 is supported by the housing 2202 and rotates the fan rotor 2204 around the rotating axis.

The suction port 2208 is opened at a lower portion of the housing 2202 and sucks air according to rotation of the fan rotor 2204.

In this embodiment, the suction port 2208 is provided so as to oppose to a disc-shaped bottom face 3422 described later which constitutes an inner wall of the medium circulation path 18.

The blow-out port 2210 is configured to blow out air toward the rear direction of the vehicle according to the rotation of the fan rotor 2204.

The suction port 2208 of the fan 22 and the heating part 20 are coupled via a fan suction duct 34.

A front end of the fan suction duct 34 locates at the rear side of the front face 1206 of the battery case 12 and serves as an air inlet opening 3402.

The heating part 20 is disposed inside of the front end of the fan suction duct 34 so that air sucked into the fan suction duct 34 via the air inlet opening 3402 is heated by the heating part 20.

The fan suction duct 34 contains therein an erection part 3404, a bent part 3406, a longitudinal extending part 3408 and a disc part 3410.

The erection part 3404 is configured in a manner that a portion of the fan suction duct 34 which locates at the rear side of the heating part 20 erects upward in front of the second battery group 14B.

The longitudinal extending part 3408 communicates with an upper end of the erection part 3404 via the bent part 3406, and extends in the longitudinal direction of the vehicle.

The disc part 3410 has a shape corresponding to the housing 2202 of the fan 22. A disc-shaped space 3412 is formed within the disc part 3410. An upper portion of the disc-shaped space 3412 communicates with the suction port 2208.

A lower portion of an external periphery of the disc-shaped space 3412 is partitioned by a bottom face 3420 of an annular plate shape. A center portion of the disc-shaped space 3412 is partitioned by a disc-shaped bottom face 3422. The disc-shaped bottom face 3422 locates above the annular-plate shaped bottom face 3420.

The bent part 3406 locates between the erection part 3404 and the longitudinal extending part 3408, and the disc-shaped bottom face 3422 locates above the annular-plate shaped bottom face 3420. Thus, radiation heat from the heating part 20 is shielded and does not reach the disc-shaped bottom face 3422.

In other words, the disc-shaped bottom face 3422 locates between the bent part 3406 and the fan 22.

The excessive heating preventing part 24 is provided at the medium circulation path 18 and stops the heating operation of the heating part 20 at a predetermined temperature.

The predetermined temperature, set for the excessive heating preventing part 24 to stop the heating operation of the heating part 20, is set to be lower than an operation temperature for opening a safety valve provided at each of the battery cells 32.

The excessive heating preventing part 24 is disposed on the disc-shaped bottom face 3422 which constitutes a part of the inner wall of the medium circulation path 18 and opposes to the suction port 2208 of the fan 22. The excessive heating preventing part 24 is disposed at the heating part 20 side from an extended line of the axial center of the suction port 2208.

More in detail, the excessive heating preventing part 24 is disposed at a portion which locates in the medium circulation path 18 so as to oppose to the suction port 2208 and deviates at the upstream side of air flow from the extended line of the axial center of the suction port 2208. That is, the excessive heating preventing part 24 is disposed at a portion of a largest flow rate in the path to the suction port 2208 of the fan 22 from the heating part 20. Further, the excessive heating preventing part 24 is disposed at a portion where radiation heat from the heating part 20 is shielded by the bent part 3406.

In this embodiment, explanation is given of the case that the portion of the inner wall of the medium circulation path 18, where the excessive heating preventing part 24 is disposed, is on the disc-shaped bottom face 3422. The shape of the portion of the inner wall, where the excessive heating preventing part 24 is disposed, is not limited to a disc shape but may any desirable shape.

Figure 5A:
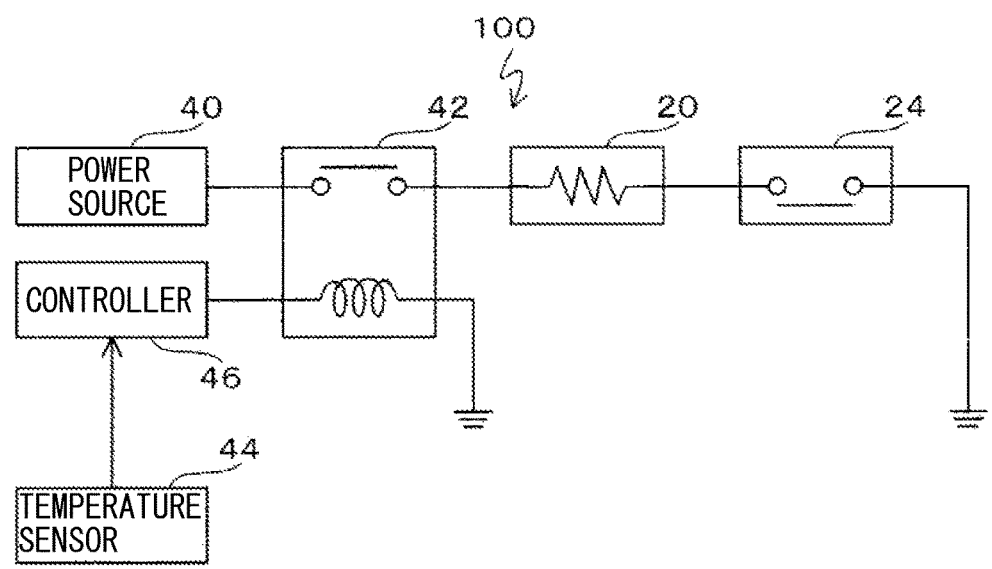
FIGS. 5A and 5B are block diagrams each showing a configuration of a control system of the temperature control device for the battery pack according to the embodiment.

In this embodiment, as shown in FIG. 5A, the excessive heating preventing part 24 is configured of a thermostat switch.

The thermostat switch is turned on at a temperature lower than the predetermined temperature to thereby supply current to the heating part 20. The thermostat switch is turned off at a temperature equal to or higher than the predetermined temperature to thereby stop current supply to the heating part 20.

Figure 5B:
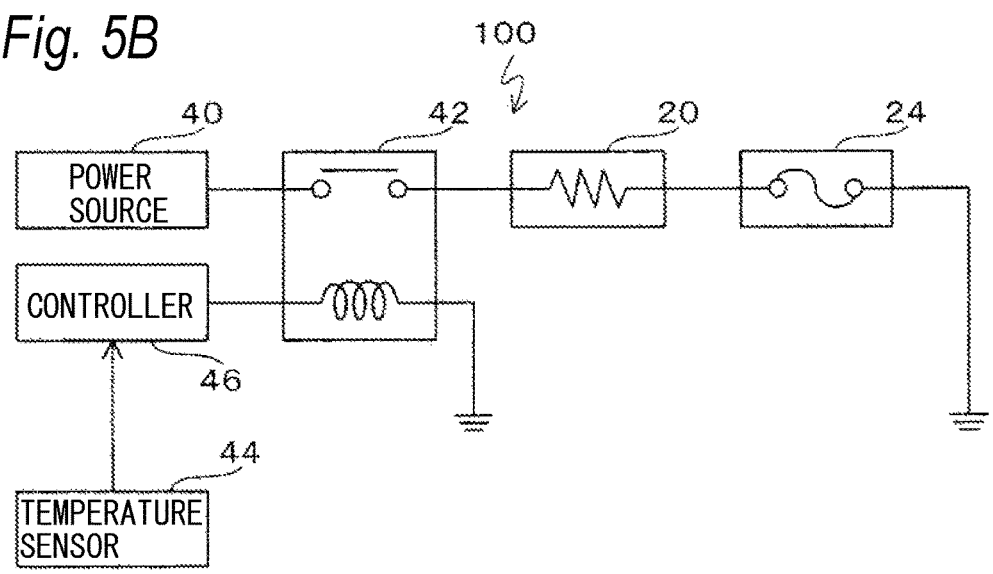

Incidentally, as shown in FIG. 5B, a temperature fuse which melts at the predetermined temperature as described later may be used as the excessive heating preventing part 24.

The medium circulation path 18 circulates air within the battery case 12 to thereby heat the battery 14.

As shown in FIGS. 2 to 4, the medium circulation path 18 is configured by including a space portion between the inner wall of the battery case 12 and the first and second battery groups 14A, 14B, a blowing duct 36 and the fan suction duct 34.

The blowing duct 36 is coupled to the blow-out port 2210 of the fan 22.

The blowing duct 36 has a flat rectangular shape in section. The blowing duct 36 extends backward from the fan 22 at the center of the first battery group 14A in the vehicle width direction. A rear end of the blowing duct 36 constitutes a rear end opening 3602 which backward blows out air sent from the fan 22.

A plurality of blow-out ports 3604 are formed at the lower face of the blowing duct 36. A plurality of blow-out ports 3606 are formed at the left and right side faces of the blowing duct 36. Air supplied from the fan 22 is blown out downward and in the left and right side directions from the blow-out ports 3604 and the blow-out ports 3606.

When the fan 22 is driven, air within the battery case 12 is sucked into the fan suction duct 34 from the air inlet opening 3402 of the fan suction duct 34. At this time, air within the battery case 12 passes the heating part 20 and then heated. Heated air is sucked into the suction port 2208 of the fan 22, and then blown into the blowing duct 36 from the blow-out port 2210.

Heated air blown from the rear end opening 3602 of the blowing duct 36 flows backward along the upper face of the rear portion of the first battery group 14A. Then, heated air flows downward from the upper side along the rear face of the first battery group 14A. Then, heated air flows, from the rear side toward the front side, along the lower portions of the left and right side faces of the first battery group 14A and also along the gap S2 of the first battery group 14A. Further, heated air flows, from the rear side toward the front side, along the lower portions of the left and right side faces of the second battery group 14B and also along the gap S3 of the second battery group 14B. In this manner, each of the first battery group 14A and the second battery group 14B is heated.

Heated air blown from the blow-out ports 3604 formed at the lower face of the blowing duct 36 and from the blow-out ports 3606 formed at the left and right side faces of the blowing duct 36 flows toward the left and right side directions along the upper face of the first battery group 14A. Then, heated air flows downward from the upper side along the side faces of the first battery group 14A. Then, heated air flows, from the rear side toward the front side, along the lower portions of the left and right side faces of the first battery group 14A and also along the lower portions of the left and right side faces of the second battery group 14B. In this manner, each of the first battery group 14A and the second battery group 14B is heated.

Further, heated air blown from the blow-out ports 3604 formed at the lower face of the blowing duct 36 and from the blow-out ports 3606 formed at the left and right side faces of the blowing duct 36 flows downward from the upper side along the gaps S1 and the gap S2 formed between the battery blocks 28 of the first battery group 14A. Then, the heated air flows, from the rear side toward the front side, along the lower portions of the left and right side faces of the first battery group 14A and also along the gap S2 of the first battery group 14A. Then, the heated air flows, from the rear side toward the front side, along the lower portions of the left and right side faces of the second battery group 14B and also along the gap S3 of the second battery group 14B. In this manner, each of the first battery group 14A and the second battery group 14B is heated.

Air having heated the first battery group 14A and the second battery group 14B is sucked into the fan suction duct 34 from the air inlet opening 3402 of the fan suction duct 34. At this time, air is heated by the heating part 20. Heated air is circulated in the aforesaid manner, thereby repeatedly heating the first battery group 14A and the second battery group 14B.

Next, explanation will be given of a control system of the battery pack temperature control device 100 with reference to FIG. 5A.

The battery pack temperature control device 100 includes a power source 40, a relay 42, the excessive heating preventing part 24, temperature sensors 44 and a controller 46.

The power source 40 supplies current to the heating part 20.

The power source 40 may be operated by electric power supplied from the battery pack 10. Alternatively, the power source 40 may be operated by electric power supplied from an auxiliary battery provide separately from the battery pack 10.

The relay 42 is provided between the power source 40 and the heating part 20, and turned on and off under control of the controller 46.

The excessive heating preventing part 24 is connected in series to the heating part 20 and the power source 40.

Each of the temperature sensors 44 is provided at corresponding one of the battery modules 30 and detects a temperature of the corresponding battery module 30.

The controller 46 turns on and off the relay 42 based on detection results of temperatures from the respective temperature sensors 44.

Next, explanation will be given of an operation of the battery pack temperature control device 100

The controller 46 determines whether or not the battery 14 needs to be heated based on detection results of temperatures from the respective temperature sensors 44.

For example, when a temperature of each of the battery modules 30 becomes lower than a predetermined first threshold value TL, the controller determines that the battery 14 needs to be heated and turns the relay 42 on. By doing so, the heating part 20 starts to heat the battery 14.

That is, current flows from the power source 40 to the excessive heating preventing part 24 via the relay 42 and the heating part 20, thereby starting the heating operation of the heating part 20. When the fan 22 is operated, air heated within the battery case 12 is circulated through the medium circulation path 18, thus heating the battery 14.

As a result, temperature of the battery 14 increases, and hence reduction of output of the battery can be avoided. When a temperature of each of the battery modules 30 becomes higher than a predetermined second threshold value TH (>TL), the controller 46 determines that the battery 14 does not need to be heated and turns the relay 42 off. By doing so, current supply from the power source 40 to the heating part 20 is stopped, and hence heating of the battery 14 is stopped.

The fan 22 is controlled so as to suitably heat the battery 14. For example, the fan 22 is controlled in a manner that the fan is operated at the time of starting the heating operation of the heating part 20, whilst the fan is stopped at the time of stopping the heating operation of the heating part 20

Due to a failure of the relay 42 or the controller 46, if current is continuously supplied from the power source 40 to the heating part 20, temperature of the battery 14 continues to increase and then temperature of the excessive heating preventing part 24 reaches the predetermined temperature or more. At this time, the excessive heating preventing part 24 is switched from an on state to an off state, thus stopping current supply to the heating part 20.

As a result, excessive heating of the battery 14 can be suppressed.

As shown in FIG. 5B, a temperature fuse may be used as the excessive heating preventing part 24. In the case of using the temperature fuse, if the temperature fuse melts once, the heating operation of the heating part 20 cannot be restored even when the temperature reduces to a value lower than the predetermined temperature. Thus, the temperature fuse is required to be exchanged by another one.

In contrast, in the case of using the thermostat as the excessive heating preventing part 24, if the thermostat is turned off once, the heating operation of the heating part 20 can be restored advantageously when the temperature reduces to a value lower than the predetermined temperature.

As explained above, according to the embodiment, air heated by the heating part 20 is blown by the fan 22 into the medium circulation path 18 provided within the battery case 12, thus heating the battery 14. The excessive heating preventing part 24 provided at the medium circulation path 18 stops the heating operation of the heating part 20 at the predetermined temperature. The excessive heating preventing part 24 is disposed between the heating part 20 and the fan 22.

According to this arrangement, excessive heating of air heated by the heating part 20 can be detected in an early stage. Further, excessive heating of the heating part 20 can be detected in an early stage. Thus, the excessive heating preventing part 24 can stop the heating operation of the heating part 20 in an early stage. As a result, excessive heating of the battery 14 can be suppressed surely. This is advantageous in improving durability of the battery 14.

Further, according to the embodiment, the medium circulation path 18 includes the bent part 3406 between the heating part 20 and the fan 22. The excessive heating preventing part 24 is disposed at the portion between the bent part 3406 and the fan 22. At this portion, radiation heat from the heating part 20 is shielded by the bent part 3406.

According to this arrangement, the excessive heating preventing part 24 is hardly affected by radiation heat from the heating part 20, and hence the excessive heating preventing part 24 can more accurately detect excessive heating of the heating part 20. Thus, the excessive heating preventing part 24 can surely stop the heating operation of the heating part 20. As a result, excessive heating of the battery 14 can be surely suppressed. This is more advantageous in improving durability of the battery 14.

In this embodiment, the excessive heating preventing part 24 is disposed above the heating part 20.

According to this arrangement, even in a stop state of the fan 22, as air heated by the heating part 20 reaches the excessive heating preventing part 24 due to convection, the excessive heating preventing part 24 can surely detect excessive heating of the heating part 20. Thus, the excessive heating preventing part 24 can surely stop the heating operation of the heating part 20 even in the stop state of the fan 22. As a result, excessive heating of the battery 14 can be surely suppressed. This is more advantageous in improving durability of the battery 14.

According to this embodiment, the excessive heating preventing part 24 is disposed on the disc-shaped bottom face 3422, which opposes to the suction port 2208 of the fan 22 and locates at the inner wall of the medium circulation path 18. The excessive heating preventing part 24 locates on the heating part 20 side from the axial center of the suction port 2208.

In other words, the excessive heating preventing part 24 is disposed at a position near the suction port 2208 of the fan 22 and shifted on the upstream side of air flow from the axial center of the suction port 2208.

According to this arrangement, an air volume supplied to the excessive heating preventing part 24 can be secured to a large value. Thus, the excessive heating preventing part 24 can detect temperature of air heated by the heating part 20 in an earlier stage, and hence can detect excessive heating of the heating part 20 in an earlier stage. As a result, when temperature of the heating part 20 increases excessively, the excessive heating preventing part 24 can stop the heating operation of the heating part 20 in an earlier stage, and hence excessive heating of the battery 14 can be surely suppressed. This is more advantageous in improving durability of the battery 14.

What is claimed is:

1. A temperature control device for a battery pack of a vehicle, comprising:
    a medium circulation path which is provided within a battery case accommodating a battery for travelling the vehicle and circulates heating medium therein to heat the battery;
    a heating part which is provided in the medium circulation path and heats the heating medium;
    a fan which is provided in the medium circulation path and sends the heating medium; and
    an excessive heating preventing part which is provided in the medium circulation path between the heating part and the fan and stops a heating operation of the heating part at a predetermined temperature of the heating medium,
    wherein the heating part, the excessive heating preventing part, the fan, and the battery are arranged in this order in a flow direction of the heating medium,
    wherein the medium circulation path comprises:
        an erection part that erects upward from a portion located at a downstream of the heating part in the flow direction of the heating medium;
        a bent part that bends in a horizontal direction from an upper end of the erection part; and
        a space including part that includes a space portion whose upper part communicates with a suction port of the fan, and
    wherein the space including part has an inner wall of the medium circulation path which opposes the suction port, the space including part communicates to the erection part through the bent part, and the excessive heating prevention part is disposed on the inner wall.

2. The temperature control device for a battery pack according to claim 1, wherein
    the bent part is disposed between the heating part and the fan, and
    the excessive heating preventing part is disposed between the bent part and the fan.

3. The temperature control device for a battery pack according to claim 2, wherein
    the excessive heating preventing part is disposed at upper position than the heating part.

4. The temperature control device for a battery pack according to claim 3, wherein
    the excessive heating preventing part is disposed at a portion on the inner wall opposing to the suction port, the portion locating on the heating part side from an axial center of the suction port.

5. The temperature control device for a battery pack according to claim 1, wherein
    the excessive heating preventing part is disposed at upper position than the heating part.

6. The temperature control device for a battery pack according to claim 5, wherein
    the excessive heating preventing part is disposed at a portion on the inner wall opposing to the suction port, the portion locating on the heating part side from an axial center of the suction port.

7. The temperature control device for a battery pack according to claim 1, wherein
    the excessive heating preventing part is disposed at a portion on the inner wall opposing to the suction port, the portion locating on the heating part side from an axial center of the suction port.

8. The temperature control device for a battery pack according to claim 2, wherein
    the excessive heating preventing part is disposed at a portion on the inner wall opposing to the suction port, the portion locating on the heating part side from an axial center of the suction port.

9. The temperature control device for a battery pack according to claim 1, wherein
    the excessive heating preventing part is a thermostat switch.

10. The temperature control device for a battery pack according to claim 1, wherein
    the excessive heating preventing part is a temperature fuse.

11. A temperature control device for a battery pack of a vehicle, comprising:
    a medium circulation path which is provided within a battery case accommodating a battery for travelling the vehicle and circulates heating medium therein to heat the battery;
    a heating part which is provided in the medium circulation path and heats the heating medium;
    a power source that provides and electrical power to the heating part;
    a fan which is provided in the medium circulation path and sends the heating medium;
    a controller that outputs a signal to turn the heating part on or off based on a temperature of the battery; and
    an excessive heating preventing part which is provided in the medium circulation path and which forcedly terminates the electrical power supplied to the heating part when a temperature of the heating medium reaches a predetermined temperature regardless of the signal output from the controller,
    wherein the heating part, the excessive heating preventing part, the fan, and the battery are arranged in this order in a flow direction of the heating medium,
    wherein the medium circulation path comprises:
        an erection part that erects upward from a portion located at a downstream of the heating part in the flow direction of the heating medium;
        a bent part that bends in a horizontal direction from an upper end of the erection part; and
        a space including part that includes a space portion whose upper part communicates with a suction port of the fan, and
    wherein the space including part has an inner wall of the medium circulation path which opposes the suction port, the space including part communicates to the erection part through the bent part, and the excessive heating prevention part is disposed on the inner wall.

12. The temperature control device for a battery pack according to claim 11, wherein
    the excessive heating preventing part is a thermostat switch.

13. The temperature control device for a battery pack according to claim 11, wherein the excessive heating preventing part is a temperature fuse.

* * * * *